United States Patent
Childress et al.

(10) Patent No.: US 10,348,768 B2
(45) Date of Patent: Jul. 9, 2019

(54) DERIVING OPTIMAL ACTIONS FROM A RANDOM FOREST MODEL

(71) Applicant: International Business Machines Corporation, Armonk, NY (US)

(72) Inventors: Rhonda L. Childress, Austin, TX (US); Michael E. Nidd, Zurich (CH); Michelle Rivers, Marietta, GA (US); George E. Stark, Lakeway, TX (US); Srinivas B. Tummalapenta, Broomfield, CO (US); Dorothea Wiesmann, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/453,991

(22) Filed: Mar. 9, 2017

(65) Prior Publication Data
US 2018/0262531 A1 Sep. 13, 2018

(51) Int. Cl.
G06F 1/00 (2006.01)
H04L 29/06 (2006.01)
G06N 20/00 (2019.01)

(52) U.S. Cl.
CPC ............. H04L 63/20 (2013.01); G06N 20/00 (2019.01); H04L 63/1425 (2013.01); H04L 63/1433 (2013.01)

(58) Field of Classification Search
CPC ............................. H04L 63/20; G06N 99/005
USPC .............................................. 707/719; 706/12
See application file for complete search history.

(56) References Cited

U.S. PATENT DOCUMENTS

| 6,513,025 B1 * | 1/2003 | Rosen .................... G06N 5/025 706/45 |
| 8,041,663 B2 | 10/2011 | Beaty et al. |
| 8,200,659 B2 * | 6/2012 | Zibitsker ............... G06F 9/5083 707/719 |

(Continued)

OTHER PUBLICATIONS

Cui et al., "Optimal Action Extraction for Random Forests and Boosted Trees", Proceedings of the 21th ACM SIGKDD International Conference on Knowledge Discovery and Data Mining (KDD '15), Aug. 2015, 10 pages.

(Continued)

*Primary Examiner* — Aurel Prifti
(74) *Attorney, Agent, or Firm* — Yee & Associates, P.C.; Jeffrey LaBaw

(57) ABSTRACT

Training a random forest model to relate settings of a network security device to undesirable behavior of the network security device is provided. A determination of a corresponding set of settings associated with each region of lowest incident probability is made using a random forest. The plurality of identified desired settings are presented as options for changing the network security device from the as-is settings to the identified desired settings. A choice is received from the plurality of options. The choice informs the random forest model. The random forest model ranks for a new problematic network security device the plurality of options for changing the new problematic network security device from as-is settings to desired settings by aggregating an identified cost of individual configuration changes, thereby identifying a most cost-effective setting for the network security device to achieve a desired output of the network security device.

20 Claims, 4 Drawing Sheets

(56) References Cited

U.S. PATENT DOCUMENTS

| | | | | |
|---|---|---|---|---|
| 8,954,309 | B2* | 2/2015 | B'Far | G06F 11/302 |
| | | | | 703/13 |
| 9,800,506 | B2* | 10/2017 | Vasseur | H04L 47/127 |
| 2006/0074970 | A1* | 4/2006 | Narayanan | G06F 11/3419 |
| 2007/0174335 | A1* | 7/2007 | Konig | G06F 17/30306 |
| 2011/0072253 | A1 | 3/2011 | Iqbal et al. | |
| 2013/0211999 | A1 | 8/2013 | Madhaven et al. | |
| 2015/0193697 | A1* | 7/2015 | Vasseur | G06N 99/005 |
| | | | | 706/12 |
| 2017/0032267 | A1 | 2/2017 | Bogojeska et al. | |
| 2017/0154268 | A1* | 6/2017 | Goldin | G06F 17/18 |
| 2017/0178027 | A1* | 6/2017 | Duggan | G06F 17/30312 |
| 2018/0174060 | A1* | 6/2018 | Velez-Rojas | G06N 5/04 |
| 2018/0193660 | A1* | 7/2018 | DiMauro | A61N 5/0603 |
| 2018/0219889 | A1* | 8/2018 | Oliner | H04L 63/1425 |
| 2018/0240041 | A1* | 8/2018 | Koch | G06F 16/24578 |

OTHER PUBLICATIONS

Domingos, "Knowledge Discovery Via Multiple Models", Intelligent Data Analysis, vol. 2, No. 3, May 1998, pp. 187-202.

Shamsinejadbabaki et al., "Causality-based Cost-effective Action Mining", Intelligent Data Analysis, vol. 17, No. 6., Nov. 2013, pp. 1075-1091.

Yang et al., "Postprocessing Decision Trees to Extract Actionable Knowledge," Proceedings of the Third IEEE International Conference on Data Mining (ICDM 2003), Nov. 2003, 9 pages.

* cited by examiner

DERIVING OPTIMAL ACTIONS FROM A RANDOM FOREST MODEL

BACKGROUND

1. Field

The disclosure relates generally to computer security, and more specifically, to techniques for deriving optimal actions from a random forest model that relates the settings of a network security device and its availability.

2. Description of the Related Art

As used herein, the term "information technology environment" refers to a relatively large number of information technology hardware devices such as servers, routers, firewalls, hubs, work stations, storage devices and other computer-related physical devices. Some of these hardware devices also can be implemented as virtual devices, such as virtual firewalls. Typically, but not necessarily, hardware devices are kept at a common physical location, though an information technology environment may be distributed among different physical locations in some cases. The term "relatively large" depends on user needs and the goal of the entity responsible for the information technology environment, though typically "relatively large" means at least dozens, and typically hundreds of hardware devices all directed towards forwarding the goal of the entity. A large information technology environment may include thousands of hardware devices or more. An "information technology environment" may also be referred to as a "server farm" in some cases, and in other cases might be referred to as an "infrastructure as a service enterprise."

Thus, information technology environments come in various sizes; however, medium to large information technology environments maintain hundreds of hardware devices. However, hardware devices have somewhat unpredictable failure rates. Failure of hardware devices may be unacceptable if failure leads to loss of information, of the entity's ability to provide a service, of revenue, of reputation, or leads either compromised security or to the consumption of network bandwidth to recover and restore the data.

SUMMARY

A computer-implemented method using a processor. The method includes training a random forest model to relate settings of a network security device to undesirable behavior of the network security device. The method also includes receiving, from the settings, a subset of representative settings in a neighborhood of an as-is state of the network security device. The method also includes forming an array using the subset of representative settings. The method also includes traversing the array to find regions of low incident probability in the neighborhood. The method also includes determining a corresponding set of settings associated with each region of lowest incident probability, resulting in a plurality of identified desired settings. The method also includes presenting the plurality of identified desired settings as a plurality of options for changing the network security device from the as-is settings to the identified desired settings. The method also includes receiving a choice from the plurality of options. The method also includes using the choice to inform the random forest model such that the random forest model learns from preferred combined changes and a cost of changing individual configuration attributes of components of settings. The method also includes using the random forest model to rank for a new problematic network security device the plurality of options for changing the new problematic network security device from as-is settings to desired settings by aggregating an identified cost of individual configuration changes, thereby identifying a most cost-effective setting for the network security device to achieve a desired output of the network security device.

The illustrative embodiments also provide for a computer including program code for performing the above method. The illustrative embodiments also provide for a computer program product for performing the above method.

DETAILED DESCRIPTION

Figure 1:
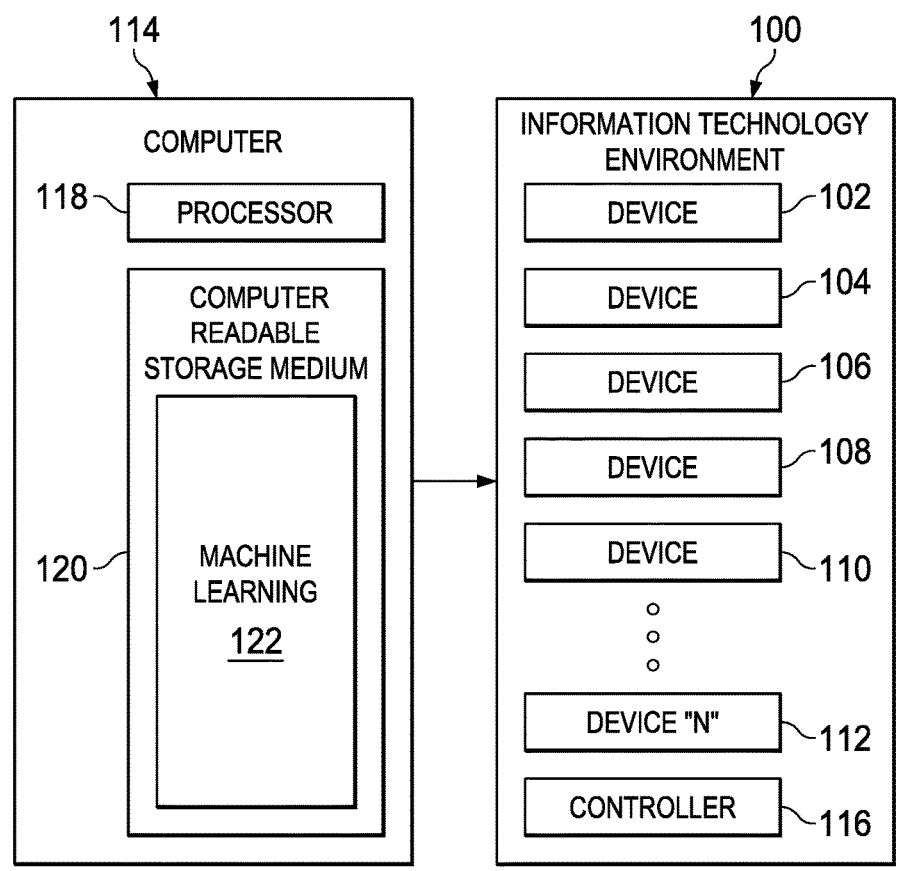
FIG. 1 is a block diagram of an information technology environment in accordance with an illustrative embodiment.

The illustrative embodiments recognize and take into account that additive tree models (ATMs) such as random forest models or gradient boosting trees are seen as the best off-the-shelf classifiers in terms of accuracy and stability. However, ATMs lack both comprehensibility, that is the ability for a human to understand the learned relations, and actionability, that is the ability to derive the best set of actions to optimize the output.

On the other hand, simple models, such as single decision trees, suffer from higher variance (overfitting) and consequently lower accuracy when applied to unseen test data and lower stability given small variations in the input training data. However, if not too deep or complex, they can be interpreted by a human. In addition, actions can be derived that maximize the expected profit. However, the simple models may not produce the best results.

Thus, the illustrative embodiments provide for a method and implementation to extract comprehensible actions for a human subject matter expert to choose from for a random forest model that relates the probability of a network security device being problematic, i.e. having more than a predefined number of high impact incidents, with its configuration and load. Furthermore, from the choice of the expert regarding which of the comprehensible actions to implement, the system will learn a cost function that captures the effort or cost of the change of individual input variables for network security device configurations.

More particularly, the illustrative embodiments provide for improving network security by deriving optimal actions from a random forest model that relates the settings, such as configuration and load, of a network security device and its availability. Thus, the illustrative embodiments provide for improving productivity and ensuring continued operation of network security devices within an information technology environment. As used herein, the term "network security device" refers to a hardware device in an "information technology environment which has either been configured or programmed to monitor, manage, or implement security in the information technology environment.

In particular, the random forest model is trained to be able to predict whether a network security device is problematic. A network security device is problematic if it has more than a predefined number of high impact incidents, with its configuration and load.

Assuming a certain network security device is problematic with its current settings, the random forest model can be used to determine configuration and load settings with which the device would be predicted to be nonproblematic. A network security device is nonproblematic if it operates normally without high-impact incident tickets. Multiple such settings, which are combination of configuration parameter settings and load components, could yield nonproblematic behavior.

In addition, the illustrative embodiments recognize and take into account that, by observing the choices of subject matter experts regarding which of the setting changes to implement to arrive to nonproblematic behavior for many network devices, the random forest model can be trained to quantify the preferability and cost of individual configuration changes. Such training might not be done in isolation. This new model may be referred to as a change cost model. In a different illustrative embodiment, the choices may be made by other software or hardware and then transmitted to the random forest model to serve as training data.

Once trained, the change cost model can be applied as follows: In addition to using the random forest to determine different configuration and load settings with which a network security device would be predicted to be nonproblematic, with the new change cost model, these different target settings can be ranked by the cost to change from current settings to the desired setting. Thus, the illustrative embodiments provide for improved security in an information technology environment.

The illustrative embodiments also recognize and take into account that machine learning can be used both to identify potentially problematic hardware devices in an information technology environment, and to present better or optimal configuration choices to a subject matter expert managing the information technology environment. Machine learning is a software or firmware technology that gives a computer the ability to "learn" without being explicitly programmed. Machine learning may also be described as computer algorithms (programs) that can learn from and make predictions on data.

The illustrative embodiments use a random forest as part of the machine learning process. A random forest is a "forest" of tree classifiers used to give a combined output for an input set of features. A random forest is built from numerous feature sets of training data for which the correct (most desirable) output is known. A forest of tree classifiers uses a number of decision trees in order to improve the classification rate. More broadly, decision tree learning uses a decision tree as a predictive model which maps observations about an item (represented in the branches) to conclusions about the item's target value (represented in the leaves). Decision tree learning is one of the predictive modelling approaches used in statistics, data mining, and machine learning.

While the illustrative embodiments specifically contemplate the use of random forests, other statistical models could also be used. Thus, the illustrative embodiments are not necessarily limited only to the use of random forests.

The illustrative embodiments contemplate adding a causality to the learned correlation model that forms the basis for the derived best actions. In this manner, the illustrative embodiments substantially improve over any other known use of statistical models to improve network security. This improvement is particularly pronounced with the choices of subject matter experts are observed.

For example, in the disclosed method causality is indirectly learned through observing the subject matter expert. The subject matter expert will know that increasing ice cream sales will never increase the temperature, for example, so he or she will never pick this option for an improvement action in an information technology environment, even if the model would initially suggest this action. In one illustrative embodiment, the algorithm of the illustrative embodiments would interpret this selection as most expensive (never selected). In another illustrative embodiment, this interpretation of variable changes that are never selected by the subject matter expert should be one of "excessively expensive or not causally related".

FIG. 1 is a block diagram of an information technology environment, in accordance with an illustrative embodiment. Information technology environment 100 includes at least two, but typically hundreds of hardware devices such as device 102, device 104, device 106, device 108, device 110, and possibly many other devices as represented by device "N" 112. Each device could be a computer, a router, a server, a hub, a storage device, wiring, cabling, or any piece of hardware useful in creating and sustaining information technology environment 100.

In an illustrative embodiment, one or more of the devices in information technology environment 100 may be prone to failure for one reason or another. As used herein, the term "failure" contemplates a device operating in a manner other than a desired manner, interrupted communication with a device, a physical fault in a device, a firmware or software fault in a device, or complete non-operation of the device. The illustrative embodiments contemplate predicting which device or devices in information technology environment 100 are prone to failure so that action may be taken to prevent the failure. Actions include but are not limited to reconfiguring a device, adding a new device, removing a device (and not necessarily the device prone to fault), reprogramming of a device, deactivation of a device, and other possible actions as appropriate to a given device.

Computer 114 is responsible for the prediction of which device or devices in information technology environment 100 are prone to failure. Computer 114 may be part of information technology environment 100, but could also be separate from 100 and merely in communication with the devices in information technology environment 100 or possibly in communication with controller 116 responsible for overseeing information technology environment 100.

Computer may include processor 118 and computer readable storage medium 120. Computer readable storage medium 120 may include software such as machine learning 122. Machine learning 122 uses input data from information technology environment 100. Input data may include, but is not limited to, trouble ticket descriptions and resolutions, utilization of central processing units, memory, disks, data throughput, device architecture, device age, operating system families and versions, and other information. Machine learning 122 identifies the device or devices prone to failure. Machine learning 122 may include a random forest, as described above. The illustrative embodiments described with respect to FIG. 2 through FIG. 5 provide for improvements to this process.

Figure 2:
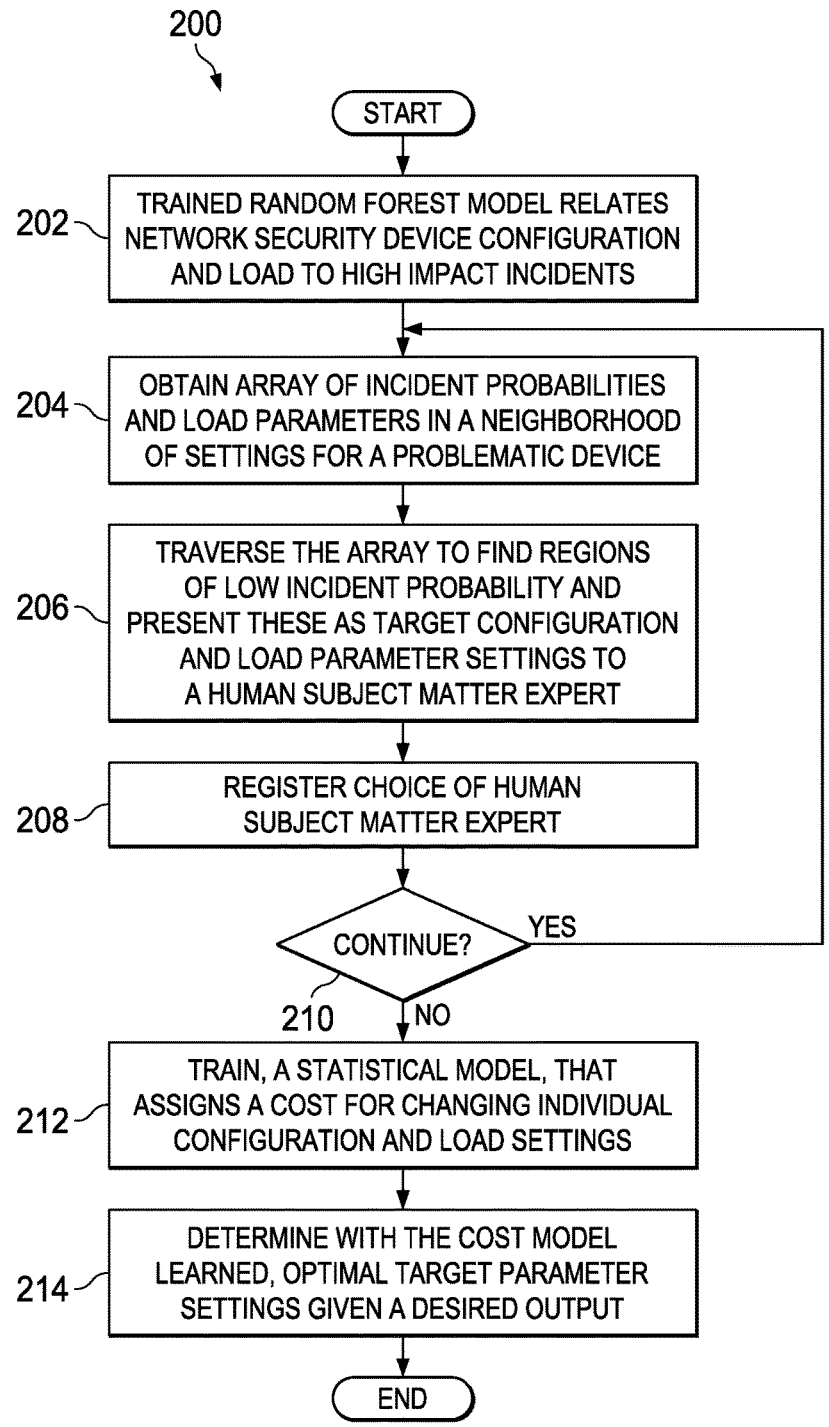
FIG. 2 is a flowchart of a computer-implemented method in accordance with an illustrative embodiment.

FIG. 2 is a flowchart of a computer implemented method, in accordance with an illustrative embodiment. In particular, method 200 is a computer-implemented method for determining optimal target parameter settings for one or more network security devices given a desired output. Method 200 is a specific illustrative embodiment of the techniques described above. Method 200 may be carried out by a data processing system, such as data processing system 400 of FIG. 4. While in some instances a model is described as taken an action, such description should be interpreted as a computer processor executing the model or an algorithm to implement the model, or should be interpreted as application specific hardware implementing the action. Each operation described in FIG. 2 may be so interpreted, except for the actual action of a human subject matter expert. However, in some illustrative embodiments, the action of a human subject matter expert could be replaced by the input of some other software or hardware analyzing the information technology environment and the hardware devices contained therein.

Method 200 may begin by the trained random forest model relating a network security device configuration and load to high impact incidents (operation 202). A high impact incident is some event that affects one or more devices in an information technology environment, or the overall operation of the information technology environment, in an undesirable manner.

Next, method 200 includes obtaining an array of incident probabilities by evaluation of a subset of most representative configuration and load parameters in a neighborhood of settings for a problematic device (operation 204). The neighborhood of settings represents a set of related new settings that may be achieved through a single reconfiguration moving the problematic device from one stable state to another. The neighbors of a state are new states of the device that are produced after altering a given state in some way. Method 200 then traverses the array to find regions of low incident probability and presents these as target configuration and load parameter settings to a human subject matter expert for consideration (operation 206). Regions of low incident probability utilize cost of reconfiguration as a distance metric to imply regions of states that are within simple reconfiguration distance of each other. For example, assume an n-dimensional plane for configuration elements where the cost of reconfiguration metric is the distance between states in that plane and a new orthogonal dimension for the probability of a device experiencing an incident (e.g. an outage) is defined. A region of low incident probability is an n-dimensional region in that plane that reasonably represents some local minimum in the incident probability dimension. In other words, regions of low incident probability are sets of similar device configurations that correspond to low incident probability. Method 200 then includes registering the choice of the human subject matter expert (operation 208). The human subject matter expert in operation 208 is discarding reconfiguration operations that are inconsistent. For example, the human subject matter expert may discard a memory upgrade for a problematic device that has no available slots for new memory or may discard an operating system upgrade for a problematic device that is owned by a customer without a license for that particular operating system upgrade. These may represent combinations of reconfigurations that a random forest model predicts in general, but that do not apply to the specific instance being considered. Registering may include storing the choice as training data in the random forest or other statistical model.

A determination is then made whether to continue (operation 210), specifically whether to continue to receive human subject matter expert choices. If "yes" at operation 210, then method 200 returns to operation 204 and additional data is obtained as operation 204, operation 206, and operation 208 are repeated. If "no" at operation 210, then method 200 continues.

In particular, after the decision at operation 210, method 200 includes training, from many human subject matter expert decisions, a statistical model, such as a random forest, that assigns a cost for changing individual configuration and load settings (operation 212). Finally, method 200 includes determining, with the cost model learned, optimal target parameter settings given a desired output (maximum allowable incident probability), thus making a random forest model actionable without sacrificing accuracy, and also training a meta-learner for visualization only, making the random forest model more comprehensible (operation 214). In one illustrative embodiment, the method may terminate thereafter.

Attention is now turned to the form of the cost function defined on the space of actions. The space of actions refers to a multi-dimensional set of reconfiguration actions that are possible for devices being maintained. In other words, the space of actions may represent a set of reconfiguration actions. Usually the cost of actions would be defined for each action component ahead of running an optimization on the best combined action to take to get at least a certain stability guaranteed. Action components in a particular example could be to upgrade an operating system, increase memory in a device, or even change the device type. The cost can be specified in any unit as the use will be only in terms of finding the most cost effective solution for a given stability target, not necessarily to give an absolute cost for that action. However, defining cost for each action component is not straight forward as many aspects to that cost need to be taken into account, which might be indirect, such as involving additional prerequisite tasks or including risks. Therefore, the illustrative embodiments may provide for learning from a human subject matter expert's preference in context the effective, relative ease or difficulty of a combined actions.

Attention is now turned to how the action cost is inferred from multiple actions suggested to a human subject matter expert. This topic is best conveyed by the following example.

Assume three combined actions are offered as possible solution to a problematic security device. These combined actions may be the nearest desired-state neighbors in the vicinity of current system state, as derived from the traversed grid. These action combinations can be described as $(a\_ij)$ where "i" is the index of the action combination, "j" is the index of the action components and "a" is the quantity of change, such as, for example, to upgrade the device by one or two versions. The action combinations could also be represented as $(s\_ij, d\_ij)$ where "s" is the start state and "d" is the desired state. Through many collected choices of the subject matter expert, the random forest model or other statistical model may learn a large set of inequalities of the following kind: $sum(d\_1j-s\_1j) > sum(d\_3j-s\_3j) > sum(d\_2j-s\_2j)$. Here it is assumed that the cost of action components adds linearly. From the multivariate inequalities individual inequalities can be derived, such as, for example: $(d\_12-s\_12) > (d\_22-s\_22) > (d\_33-s\_33)$, within one action component and across action components. This derivation will allow the addition of action components until the desired stability target is achieved, starting from the cheapest action component. Thus, the illustrative embodiments provide for an improvement over known techniques for improving stability in an information technology environment.

Method 200 has several advantages over known techniques for improving the security of information technology environments. For example, the known art merely determines one parameter combination that minimizes cost given a target outcome. Furthermore, such a model acts as a black box, providing for minimal comprehensibility. in contrast, the illustrative embodiments provide for, during the learning phase, discovery locally optimal parameter configurations in the neighborhood of problematic setting. This result achieves a level of comprehensibility unavailable in the known art.

In another example, the known art requires a cost function to be defined as input, which is rarely available as explicit knowledge. This limitation is especially true in the case security appliance configurations which are more punctuated in their options. Furthermore, downtime and investment cost are significant. In contrast, for the illustrative embodiments, from chosen configuration changes the system learns preferred transformation paths, that is changes of individual parameters, and thus deduces the change cost function from human tacit knowledge.

In still another example, a different technique from the above known art may achieve comprehension and actionability of an additive tree model by fitting a simpler model, but doing so sacrifices accuracy. In contrast, through a multi-step loop, the illustrative embodiments provide for both comprehensibility and actionability of through an additive tree model without loss in accuracy. Thus, method 200 represents a significant improvement over the known art.

In effect, the illustrative embodiments find the easiest migration paths to more stable system configurations. In doing so, the illustrative embodiments increase the number of remediation actions taken. In this manner, the illustrative embodiments may achieve a larger reduction of high-impact incidents relative to prior techniques.

Figure 3:
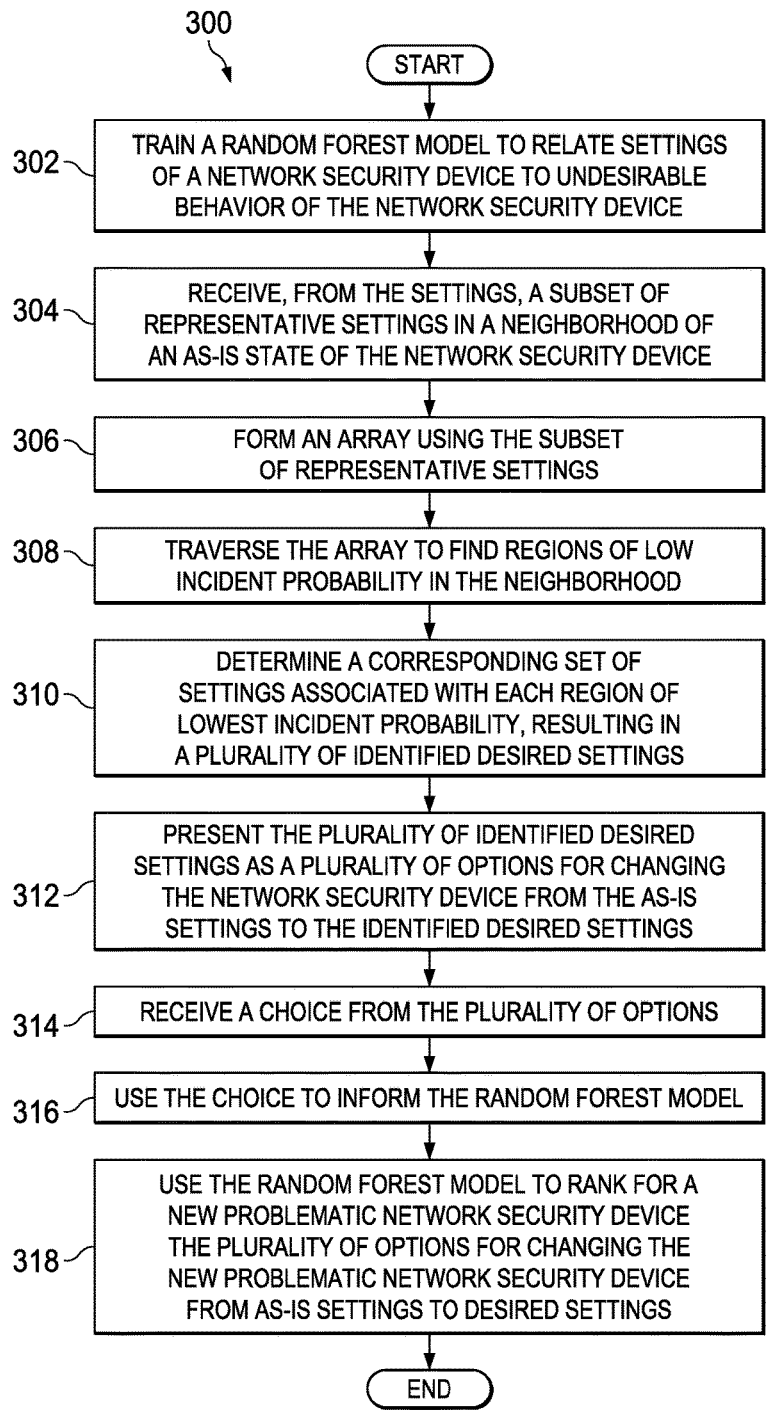
FIG. 3 is a flowchart of a computer-implemented method in accordance with an illustrative embodiment.

FIG. 3 is a flowchart of a computer-implemented method, in accordance with an illustrative embodiment. Method 300 is a variation on method 200 of FIG. 2. Method 300 is also a method for carrying out the techniques described with respect to FIG. 1. Method 300 may be implemented using a processor, such as processor 118 of FIG. 1 or processor unit 404 of FIG. 4. Method 300 may be characterized as a system and method for deriving optimal actions from a random forest model.

Method 300 includes training a random forest model to relate settings of a network security device to undesirable behavior of the network security device (operation 302). Method 300 also includes receiving, from the settings, a subset of representative settings in a neighborhood of an as-is state of the network security device (operation 304). The neighborhood represents the set of related new settings that may be achieved through a single reconfiguration moving the network security device from one stable state to another. Method 300 also includes forming an array using the subset of representative settings (operation 306). Method 300 also includes traversing the array to find regions of low incident probability in the neighborhood (operation 308).

Method 300 also includes determining a corresponding set of settings associated with each region of lowest incident probability, resulting in a plurality of identified desired settings (operation 310). Method 300 also includes presenting the plurality of identified desired settings as a plurality of options for changing the network security device from the as-is settings to the identified desired settings (operation 312).

Method 300 also includes receiving a choice from the plurality of options (operation 314). Method 300 also includes using the choice to inform the random forest model such that the random forest model learns from preferred combined changes and a cost of changing individual configuration attributes of components of settings (operation 316). Finally, method 300 also includes using the random forest model to rank for a new problematic network security device the plurality of options for changing the new problematic network security device from as-is settings to desired settings by aggregating an identified cost of individual configuration changes, thereby identifying a most cost-effective setting for the network security device to achieve a desired output of the network security device (operation 318). It should be noted that if a conflict exists between the choices made by the subject matter expert and the cost function, the choices made by the subject matter expert override the cost function because the subject matter expert is assumed to have the most complete specific knowledge of each case. The random forest model incorporates the features that are available for analysis, but outside data always exists. For example, the most efficient device upgrade option may be a larger disk. However, a more expensive, but equally promising device upgrade option may be an operating system upgrade. If the subject matter expert is aware of a business plan to upgrade the operating systems on all devices next month anyway, then this outside knowledge will outweigh anything the random forest model may incorporate. The subject matter expert benefits from the analysis that showed the two options, but utilizes the knowledge of the business plan to know that the operating system upgrade option will be less expensive than it normally would be and, therefore, overrides the cost function in making the final option selection. In one illustrative embodiment, the method may terminate thereafter.

However, method 300 may be varied. For example, in an illustrative embodiment, the settings may be a configuration and a load of the network security device. In another illustrative embodiment, traversing the array to find regions of low incident probability in the neighborhood comprises traversing the array to find regions of settings for which the network security device would be predicted to be nonproblematic.

In still another illustrative embodiment, presenting may be selected from the group consisting of: transmitting to another software or hardware device, printing, and displaying on a tangible display device. In this case, presenting may be one of printing and displaying and wherein receiving the choice is received from an input device operated by a human subject matter expert. In another case, presenting may be transmitting and wherein receiving the choice is received from the another software or hardware device which determined and selected the choice.

In still another illustrative embodiment, a setting may be composed of multiple configuration attributes and a single setting change maps to multiple configuration attribute changes. Thus, the illustrative embodiments are not necessarily limited to those shown in FIG. 3.

Additionally, still other variations are possible. For example, the illustrative embodiments contemplate a computer specially configured to carry out the operations of FIG. 3 or its variations. In another example, the illustrative embodiments contemplate a computer readable storage medium storing computer usable program code for implementing the operations of FIG. 3 or its variations. Thus, the illustrative embodiments described above do not necessarily limit the claimed inventions.

Figure 4:
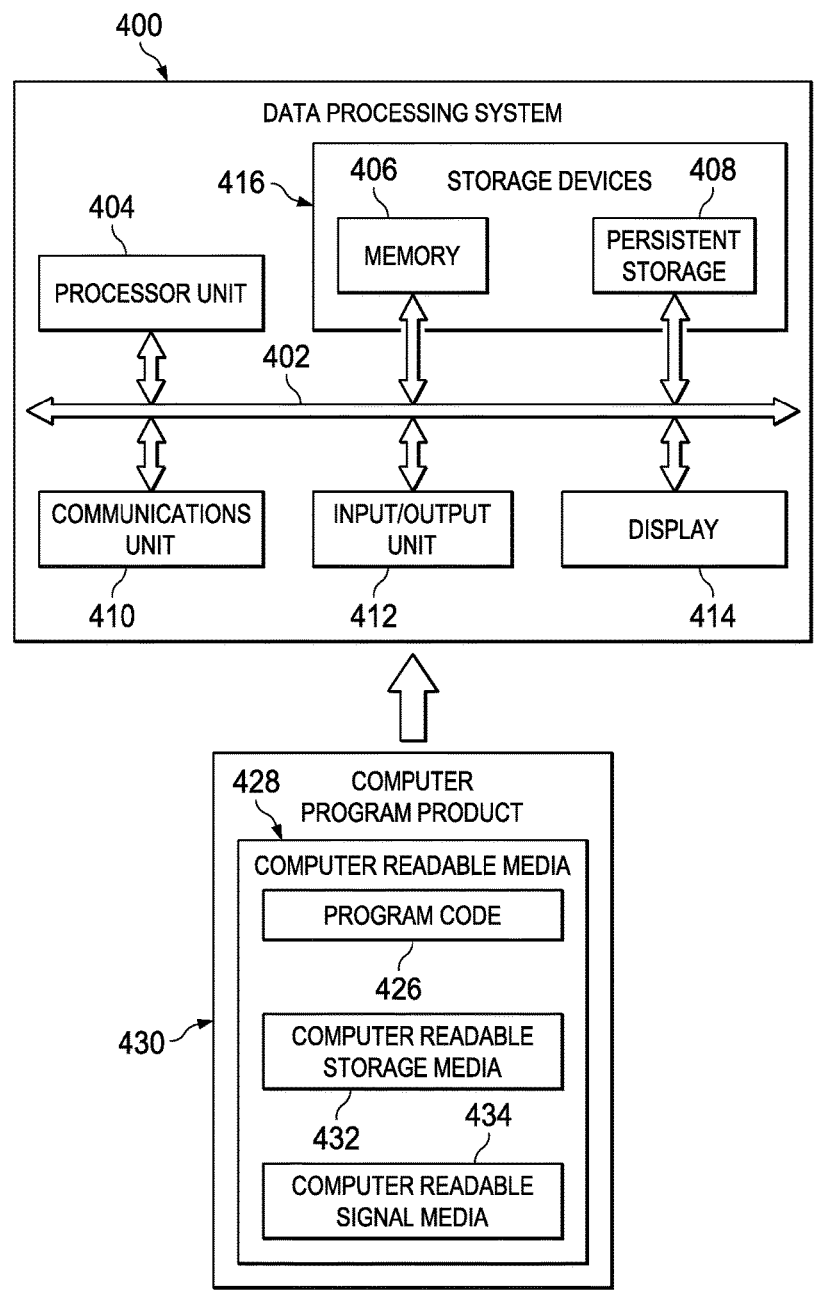
FIG. 4 is a diagram of a data processing system in accordance with an illustrative embodiment.

With reference now to FIG. 4, a diagram of a data processing system is depicted in accordance with an illustrative embodiment. Data processing system 400 is an example of a computer, in which computer readable program code or program instructions implementing processes of illustrative embodiments may be located. In this illustrative example, data processing system 400 includes communications fabric 402, which provides communications between processor unit 404, memory 406, persistent storage 408, communications unit 410, input/output unit 412, and display 414.

Processor unit 404 serves to execute instructions for software applications and programs that may be loaded into memory 406. Processor unit 404 may be a set of one or more hardware processor devices or may be a multi-processor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 406, in these examples, may be, for example, a random access memory, or any other suitable volatile or non-volatile storage device. Persistent storage 408 may take various forms, depending on the particular implementation. For example, persistent storage 408 may contain one or more devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in this example, provides for communication with other computers, data processing systems, and devices via network communications unit 410 may provide communications using both physical and wireless communications links. The physical communications link may utilize, for example, a wire, cable, universal serial bus, or any other physical technology to establish a physical communications link for data processing system 400. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 400.

Input/output unit 412 allows for the input and output of data with other devices that may be connected to data processing system 400. For example, input/output unit 412 may provide a connection for user input through a keypad, keyboard, and/or some other suitable input device. Display 414 provides a mechanism to display information to a user and may include touch screen capabilities to allow the user to make on-screen selections through user interfaces or input data, for example.

Instructions for the operating system, applications, and/or programs may be located in storage devices 416, which are in communication with processor unit 404 through communications fabric 402. In this illustrative example, the instructions are in a functional form on persistent storage 408. These instructions may be loaded into memory 406 for running by processor unit 404. The processes of the different embodiments may be performed by processor unit 404 using computer implemented program instructions, which may be located in a memory, such as memory 406. These program instructions are referred to as program code, computer usable program code, or computer readable program code that may be read and run by a processor in processor unit 404. The program code, in the different embodiments, may be embodied on different physical computer readable storage devices, such as memory 406 or persistent storage 408.

Program code 426 is located in a functional form on computer readable media 428 that is selectively removable and may be loaded onto or transferred to data processing system 400 for running by processor unit 404. Program code 426 and computer readable media 428 form computer program product 430. In one example, computer readable media 428 may be computer readable storage media 432 or computer readable signal media 434. Computer readable storage media 432 may include, for example, an optical or magnetic disc that is inserted or placed into a drive or other device that is part of persistent storage 408 for transfer onto a storage device, such as a hard drive, that is part of persistent storage 408. Computer readable storage media 432 also may take the form of a persistent storage, such as a hard drive, a thumb drive, or a flash memory that is connected to data processing system 400. In some instances, computer readable storage media 432 may not be removable from data processing system 400.

Alternatively, program code 426 may be transferred to data processing system 400 using computer readable signal media 434. Computer readable signal media 434 may be, for example, a propagated data signal containing program code 426. For example, computer readable signal media 434 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 426 may be downloaded over a network to persistent storage 408 from another device or data processing system through computer readable signal media 434 for use within data processing system 400. For instance, program code stored in a computer readable storage media in a data processing system may be downloaded over a network from the data processing system to data processing system 400. The data processing system providing program code 426 may be a server computer, a client computer, or some other device capable of storing and transmitting program code 426.

The different components illustrated for data processing system 400 are not meant to provide architectural limitations to the manner in which different embodiments may be implemented. The different illustrative embodiments may be implemented in a data processing system including components in addition to, or in place of, those illustrated for data processing system 400. Other components shown in FIG. 4 can be varied from the illustrative examples shown. The different embodiments may be implemented using any hardware device or system capable of executing program code.

As one example, data processing system 400 may include organic components integrated with inorganic components and/or may be comprised entirely of organic components excluding a human being. For example, a storage device may be comprised of an organic semiconductor.

As another example, a computer readable storage device in data processing system 400 is any hardware apparatus that may store data. Memory 406, persistent storage 408, and computer readable storage media 432 are examples of physical storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, illustrative embodiments of the present invention provide a computer-implemented method, computer system, and computer program product for improving security on a computer system by identifying compromised or potentially compromised APIs using machine learning algorithms. Optionally, only identified APIs may be subjected to static testing, as is known in the art.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method using a processor to improve a security system to determine a most cost effective setting for a network security device, the computer-implemented method comprising:
   training a random forest model to relate settings of the network security device to undesirable behavior of the network security device, wherein the settings comprise a configuration and a load of the network security device;
   receiving, from the settings, a subset of representative settings in a neighborhood of an as-is state of the network security device;
   forming an array using the subset of representative settings;
   traversing the array to find regions of low incident probability in the neighborhood, wherein traversing the array to find regions of low incident probability in the neighborhood comprises traversing the array to find regions of settings for which the network security device would be predicted to be nonproblematic;
   determining a corresponding set of settings associated with each region of lowest incident probability resulting in a plurality of identified desired settings;
   presenting the plurality of identified desired settings as a plurality of options for changing the network security device from as-is settings to the identified desired settings;
   receiving a choice from the plurality of options;
   using the choice to inform the random forest model such that the random forest model learns from preferred combined changes and a cost of changing individual configuration attributes of components of settings; and
   using the random forest model to rank for a new network security device the plurality of options for changing the new network security device from as-is settings to desired settings by aggregating an identified cost of individual configuration changes, thereby identifying a most cost-effective setting for the network security device to achieve a desired output of the network security device;
   wherein a setting of the settings is composed of multiple configuration attributes, and wherein a single setting change maps to multiple configuration attribute changes.

2. The computer-implemented method of claim 1, wherein presenting is selected from a group consisting of: transmitting to another software or hardware device, printing, and displaying on a display device.

3. The computer-implemented method of claim 2, wherein presenting comprises one of printing and displaying target configuration and load parameter settings of the network security device, and wherein receiving the choice is received from an input device operated by a human subject matter expert.

4. The computer-implemented method of claim 2, wherein presenting is transmitting, and wherein receiving the choice is received from the another software or hardware device which determined and selected the choice.

5. The computer-implemented method of claim 1, wherein the undesirable behavior of the network security device is a high impact incident event that affects the network security device in an undesirable manner.

6. The computer-implemented method of claim 1, wherein an information technology environment comprises a plurality of the network security devices, and wherein the undesirable behavior of the network security device is a high impact incident event that affects an overall operation of the information technology environment in an undesirable manner.

7. The computer-implemented method of claim 1, wherein the choice comprises discarding inconsistent reconfiguration operations of the network security device.

8. A computer comprising:
   a computer readable storage medium, wherein the computer readable storage medium stores program instructions to improve a security system to determine a most cost effective setting for a network security device; and
   a processor coupled to the computer readable storage medium, wherein the processor executes the program instructions to:
   train a random forest model to relate settings of the network security device to undesirable behavior of the network security device, wherein the settings comprise a configuration and a load of the network security device;
   receive, from the settings, a subset of representative settings in a neighborhood of an as-is state of the network security device;
   form an array using the subset of representative settings;
   traverse the array to find regions of low incident probability in the neighborhood, wherein traverse the array to find regions of low incident probability in the neighborhood comprises traverse the array to find regions of settings for which the network security device would be predicted to be nonproblematic;

determine a corresponding set of settings associated with each region of lowest incident probability, resulting in a plurality of identified desired settings;

present the plurality of identified desired settings as a plurality of options for changing the network security device from as-is settings to the identified desired settings;

receive a choice from the plurality of options;

use the choice to inform the random forest model such that the random forest model learns from preferred combined changes and a cost of changing individual configuration attributes of components of settings; and use the random forest model to rank for a new network security device the plurality of options for changing the new network security device from as-is settings to desired settings by aggregating an identified cost of individual configuration changes, thereby identifying a most cost-effective setting for the network security device to achieve a desired output of the network security device;

wherein a setting is composed of multiple configuration attributes, and wherein a single setting change maps to multiple configuration attribute changes.

9. The computer of claim 8, wherein presenting is selected from a group consisting of: transmitting to another software or hardware device, printing, and displaying on a display device.

10. The computer of claim 9, wherein presenting comprises one of printing and displaying target configuration and load parameter settings of the network security device, and wherein receiving the choice is received from an input device operated by a human subject matter expert.

11. The computer of claim 9, wherein presenting is transmitting, and wherein receiving the choice is receiving from the another software or hardware device which determined and selected the choice.

12. The computer of claim 8, wherein the undesirable behavior of the network security device is a high impact incident event that affects the network security device in an undesirable manner.

13. The computer of claim 8, wherein an information technology environment comprises a plurality of the network security devices, and wherein the undesirable behavior of the network security device is a high impact incident event that affects an overall operation of the information technology environment in an undesirable manner.

14. The computer of claim 8, wherein the choice comprises discarding inconsistent reconfiguration operations of the network security device.

15. A computer program product comprising a computer readable storage medium having program instructions embodied therewith, the program instructions executable by a processor to cause the processor to perform a method to improve a security system to determine a most cost effective setting for a network security device comprising:

training a random forest model to relate settings of the network security device to undesirable behavior of the network security device, wherein the settings comprise a configuration and a load of the network security device;

receiving, from the settings, a subset of representative settings in a neighborhood of an as-is state of the network security device;

forming an array using the subset of representative settings;

traversing the array to find regions of low incident probability in the neighborhood, wherein the traversing the array to find regions of low incident probability in the neighborhood comprises traversing the array to find regions of settings for which the network security device would be predicted to be nonproblematic;

determining a corresponding set of settings associated with each region of lowest incident probability, resulting in a plurality of identified desired settings;

presenting the plurality of identified desired settings as a plurality of options for changing the network security device from as-is settings to the identified desired settings;

receiving a choice from the plurality of options;

using the choice to inform the random forest model such that the random forest model learns from preferred combined changes and a cost of changing individual configuration attributes of components of settings; and using the random forest model to rank for a new network security device the plurality of options for changing the new network security device from as-is settings to desired settings by aggregating an identified cost of individual configuration changes, thereby identifying a most cost-effective setting for the network security device to achieve a desired output of the network security device;

wherein a setting is composed of multiple configuration attributes, and wherein a single setting change maps to multiple configuration attribute changes.

16. The computer program product of claim 15, wherein presenting is selected from a group consisting of: transmitting to another software or hardware device, printing, and displaying on a display device.

17. The computer program product of claim 16, wherein presenting comprises one of printing and displaying target configuration and load parameter settings of the network security device, and wherein receiving the choice is receiving from an input device operated by a human subject matter expert.

18. The computer program product of claim 15, wherein presenting is transmitting, and wherein receiving the choice is receiving from the another software or hardware device which determined and selected the choice.

19. The computer program product of claim 15, wherein the undesirable behavior of the network security device is a high impact incident event that affects the network security device in an undesirable manner.

20. The computer program product of claim 15, wherein an information technology environment comprises a plurality of the network security devices, and wherein the undesirable behavior of the network security device is a high impact incident event that affects an overall operation of the information technology environment in an undesirable manner.

* * * * *